Aug. 29, 1944.  T. S. BRISKIN ET AL  2,357,076
MAGAZINE EJECTOR MECHANISM FOR CAMERAS
Original Filed Nov. 10, 1941
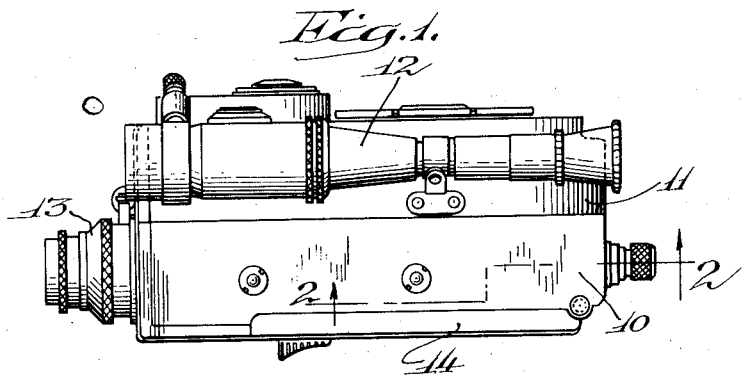
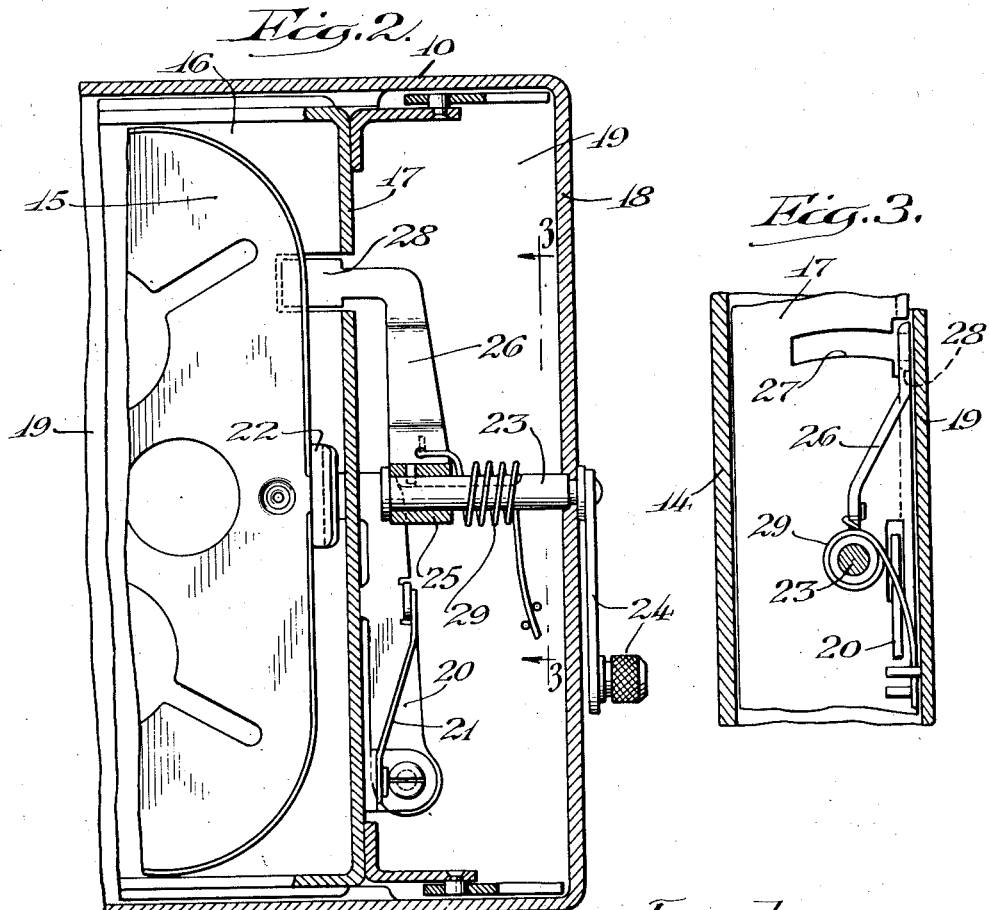
Inventors:
Theodore S. Briskin
Philmore F. Sperry, deceased
Helen B. Sperry, Executrix
By Pabel, Carlson, Gritzbaugh & Wells
Attorneys.

Patented Aug. 29, 1944

2,357,076

UNITED STATES PATENT OFFICE 2,357,076

MAGAZINE EJECTOR MECHANISM FOR CAMERAS

Theodore S. Briskin, Chicago, Ill., and Philmore F. Sperry, deceased, late of Chicago, Ill., by Helen B. Sperry, executrix, Chicago, Ill., assignors to Revere Camera Company, Chicago, Ill., a corporation of Delaware Original application November 10, 1941, Serial No. 418,526. Divided and this application November 25, 1942, Serial No. 466,864

3 Claims. (Cl. 88—17)

This application is being filed as a division of the co-pending application of Philmore F. Sperry and Theodore S. Briskin, Serial No. 418,526, filed November 10, 1941. The invention relates to motion picture cameras of the type in which a film is mounted in the camera in a lightproof magazine, having a shutter closing an exposure opening at the front face of the magazine, such magazine being supported in the camera chamber by means of a carrier which is movable forwardly and backwardly in the chamber. In this type of construction, the magazine is inserted into the carrier so as to be gripped fairly tightly by the carrier, and means is provided for pressing the magazine accurately into the desired operative position at the front of the magazine.

It is the principal object of this invention to provide an improved arrangement of means for releasing the magazine from the grip of the carrier when the magazine is to be removed from the camera. In the preferred arrangement, the magazine ejector means comprises an arm swingingly mounted at the rear portion of the magazine chamber and normally held moved sidewise out of the path of the magazine, means being provided accessible outside of the camera casing for giving the arm a swinging movement sidewise for pressing the magazine out of the grip of the carrier when the magazine and carrier are in their rearward position. The arm is preferably mounted so as to be movable backwardly out of the way of the magazine and carrier in case the arm might happen to be positioned in the path of the carrier upon its backward movement.

It is another object of this invention to improve devices of this type in sundry details hereinafter pointed out. The preferred means by which the several objects have been attained are illustrated in the accompanying drawing, in which—

Fig. 1 is a top plan view of a camera embodying the invention;

Fig. 2 is a vertical sectional view taken upon a considerably enlarged scale substantially at the line 2—2 of Fig. 1; and Fig. 3 is a vertical sectional view taken substantially at the line 3—3 of Fig. 2.

In the drawing, 10 indicates a portion of the camera casing at the side of the camera at which the film is mounted and advanced step by step for exposure, the casing being completed by a complementary casing portion 11 at the opposite side. A view finder 12 of any suitable type is mounted on the top face of the casing portion 11. At its front face, the casing portion 10 is provided with a lens system 13 of any approved type for exposure of a film therethrough. The casing portion 10 is closed at its side face by means of a door 14 pivotally mounted on a vertical axis so as to open backwardly. A film magazine 15 of well-known type is mounted in the chamber provided by the casing portion 10 by means of a carrier 16 in the form of a drawer slidable forwardly and backwardly within the chamber. For convenience of reference thereto, the rear wall of the carrier is indicated by the numeral 17, and the rear wall of the casing portion 10 is indicated by the numeral 18. The casing portions 10 and 11 are separated from each other by means of a partition 19.

In the arrangement shown, an arm 20 is pivotally mounted on the rear face of the wall 17 upon a transversely positioned axis, a heavy spring 21 being provided for pressing the arm forwardly toward the left in Fig. 2. At its upper end portion, the arm 20 is provided with a pressure plate 22 adapted to engage the film magazine 15 for pressing it forwardly in the carrier 16.

The improved ejector means by which pressure is applied transversely upon the magazine 15 for releasing it from the carrier 16 comprises a shaft 23 rotatably mounted in the rear wall portion 18 of the casing portion 10, such shaft having a crank handle 24 fixedly mounted thereon at the rear face of the camera. At its forward end, the shaft 23 is provided with a sleeve 25 mounted so as to rotate with the shaft but so as to be movable backwardly toward the right in Fig. 2 with respect to the shaft. An arm 26 is mounted upon the sleeve 25 at its top face so as to swing transversely of the camera upon a rocking movement of the shaft 23. The arm 26 is bent forwardly at its upper end so as to extend through an arc-shaped slot 27 in the rear wall 17 of the carrier, being provided with a head portion 28 movable transversely of the carrier upon a swinging movement of the arm. A coiled spring 29 is mounted upon the shaft 23, having bearings upon the arm 26 and upon the partition plate 19 so as normally to hold the arm 26 in its forward position upon the shaft 23 and also to hold the arm swung to the limit of its motion toward the partition 19 out of the path of the magazine 15 in its movement with the carrier.

The arrangement is such that when the carrier 16 is moved backwardly into the position as shown in Fig. 2, the magazine 15 is brought into position opposite to the head portion 28. The operator is able then by a stroke of the lever or handle 24 in counter clockwise direction in Fig. 3 to move the head portion 28 toward the left in said Fig. 3 against the action of the spring 29 for forcing the magazine 15 at its rear edge portion out of gripping engagement with the carrier 16. If the magazine 15 should accidentally be brought into engagement with the end of the head portion 28 during the backward movement of the carrier and the magazine, the arm 26 would move backwardly to the necessary extent along the shaft for preventing damage to the parts.

By the use of the improved ejector means, an operator is enabled readily and quickly to loosen the magazine from the grip of the carrier when the carrier is in its rearmost position so as to enable the magazine easily to be withdrawn from the carrier.

While we prefer to employ the form and arrangement of parts as above described, it is to be understood that our invention is not limited strictly thereto except so far as the claims may be so limited, since changes might well be made in the form and arrangement of the parts without departing from the spirit of the invention.

We claim:

1. In a magazine type motion picture camera, the combination of a casing, lens means operatively mounted in said casing, a magazine carrier movable in said casing toward and from said lens means, a shaft rotatably mounted in said casing opposite to the rear face of said carrier, an arm mounted on said shaft so as to be adapted to swing transversely across the path of the carrier, yielding means normally holding said arm swung to one side out of the path of said magazine, and means for giving said shaft and arm a rocking movement adapted when the carrier and magazine are in their backwardly retracted position to press the magazine transversely out of the grip of the carrier.

2. In a magazine type motion picture camera, the combination of a casing, lens means operatively mounted in said casing, a magazine carrier movable in said casing toward and from said lens means, a shaft rotatably mounted in said casing opposite to the rear face of said carrier, an arm mounted on said shaft so as to be slidable backwardly thereon but so as to rock therewith and having a portion in position to engage said magazine when the carrier is in its backwardly retracted position for pressing the magazine transversely out of the grip of the carrier, yielding means normally holding said arm out of pressure relationship to said magazine, and means for giving said shaft and arm a rocking movement for releasing said magazine.

3. In a magazine type motion picture camera, the combination of a casing, lens means operatively mounted in said casing, a magazine carrier movable in said casing toward and from said lens means, a shaft rotatably mounted in said casing opposite to the rear face of said carrier, an arm mounted on said shaft so as to be movable backwardly thereon but so as to rock therewith about the shaft and having a portion in position to engage said magazine when the carrier is in its backwardly retracted position for pressing the magazine transversely out of the grip of the carrier, yielding means normally holding said arm moved to the limit of its forward motion on said shaft and swung to one side out of the path of said magazine, and means for giving said shaft and arm a rocking movement adapted when the carrier and magazine are in their backwardly retracted position to press the magazine transversely out of the grip of the carrier.

THEODORE S. BRISKIN.
HELEN B. SPERRY,
*Executrix of the Estate of Philmore F. Sperry, Deceased.*